Patented Feb. 11, 1947

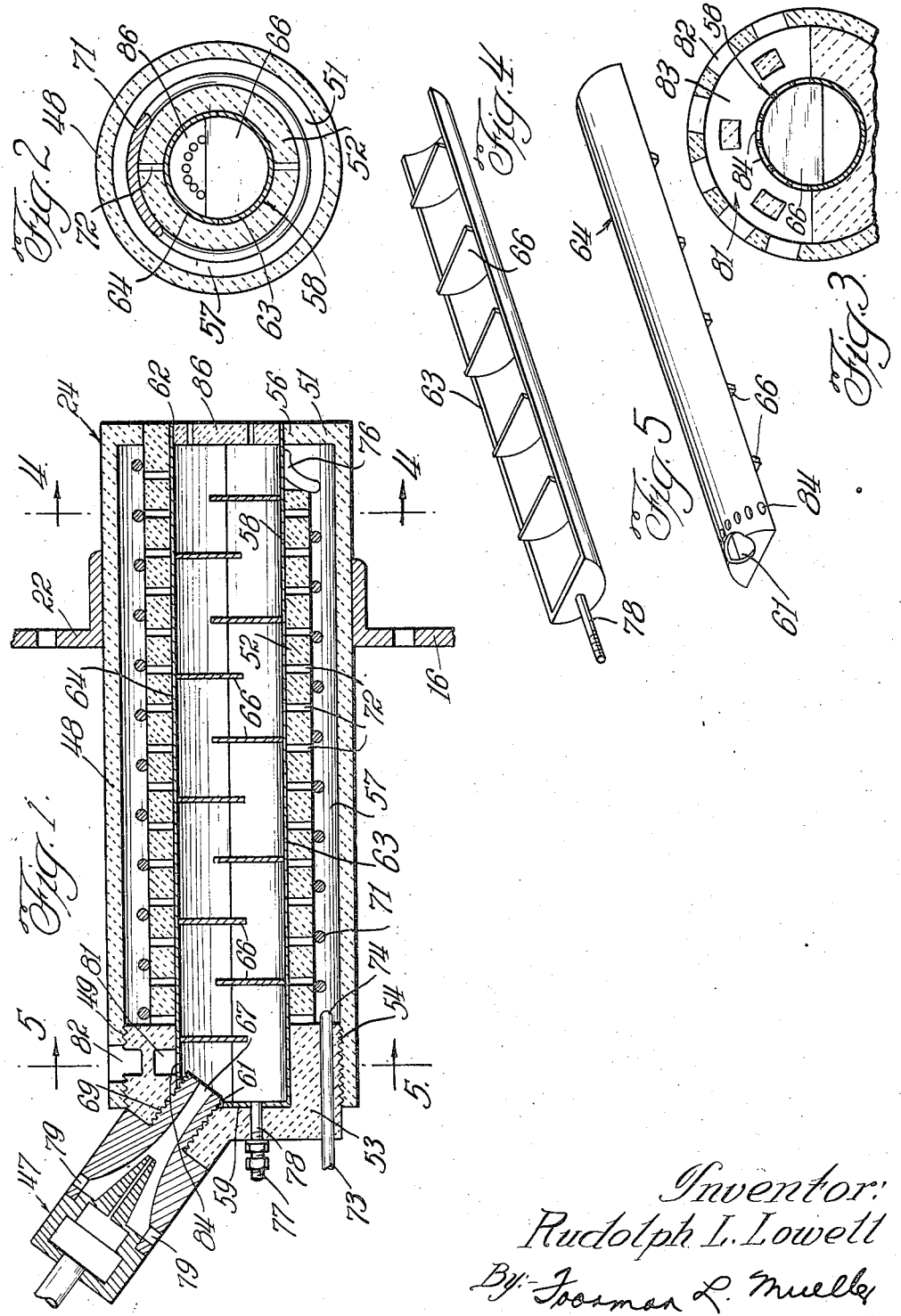

2,415,748

UNITED STATES PATENT OFFICE 2,415,748

LIQUID FUEL PREPARING APPARATUS

Rudolph L. Lowell, Chicago, Ill., assignor to Galvin Manufacturing Corporation, Chicago, Ill., a corporation of Illinois Application March 8, 1943, Serial No. 478,457

4 Claims. (Cl. 48—103)

This invention relates generally to means for preparing a liquid fuel for burning and in particular to such means, having an electrical element, which is constructed to use to the fullest extent the heat developed by the heating element for heating the liquid fuel.

In many of the prior art liquid fuel preparing means an electrical heater of resistance type is generally used to heat and prepare the fuel for burning. Further these fuel preparing means usually include a metal or like heat conducting fuel conditioning or mixing portion arranged in a heat exchange relation with the heating element so that heat from the element is applied to the conditioning portion and in turn to the fuel in the conditioning portion. Usually the coil and/or the conditioning portion are assembled within the fuel preparing means so that some of the heat developed by the element is dissipated to the atmosphere or portions adjacent to the coil and the conditioning portion. As a result the heat developed by the coil is not used to the fullest extent for fuel preparing purposes. Thus in the initial operation of the fuel preparing means a longer time is required to bring the fuel conditioning portion up to an optimum fuel preparing temperature than would be necessary if substantially all of the heat generated by the element was effective in heating the conditioning portion. Further in the normal operation of the fuel preparing means a greater electrical output to the element is required to maintain an optimum fuel conditioning temperature than when substantially all of the heat from the element is available for fuel heating purposes. These factors are particularly important where the electrical imput to the element is limited, such for example as where a usual vehicle storage battery is the sole source of power supply for the element, because any increased current drain on the battery by the element appreciably shortens the life of the battery and the effective capacity at which it can be used to efficiently operate the element.

It is the object of this invention, therefore, to provide an improved liquid fuel preparing apparatus.

Another object of this invention is to provide a liquid fuel preparing apparatus in which substantially all of the heat from an electrical heating element is effectively applied to the fuel.

A further object of this invention is to provide a liquid fuel preparing apparatus which is of a construction such that the heat from an electrical heating element is applied on the fuel so as to heat the fuel to an optimum temperature for preparing the fuel in a minimum of time.

A feature of this invention is found in the provision of a liquid fuel preparing apparatus in which a fuel conditioning portion and an electrical heating element therefor are fully enclosed by heat insulating means whereby substantially all of the heat developed by the element is available for heating the fuel conditioning portion.

Further objects, features and advantages of this invention will become apparent from the following description when taken in connection with the accompanying drawing in which:

Fig. 1 is an enlarged sectional detailed view of the fuel preparing apparatus of this invention;

Fig. 2 is a sectional view of the fuel preparing apparatus taken along line 4—4 in Fig. 1;

Fig. 3 is a fragmentary sectional view of the fuel preparing apparatus taken on the line 5—5 in Fig. 1;

Fig. 4 is a view in perspective of a half part of an air and fuel mixing or conditioning tube used in the apparatus of this invention; and Fig. 5 is a view in perspective of a mating half part for the half part of the conditioning tube shown in Fig. 4.

The liquid fuel preparing apparatus of this invention is applicable to an air heating unit of internal combustion type, and is of a construction which permits it to be assembled directly in the inlet of the combustion chamber for the heating unit. The apparatus includes in combination an inner electrical insulating tubular member concentrically positioned within an outer heat insulating tube, with these two tubes being supported in a spaced relation by heat insulating means adapted to close the opposite ends of the space between the tubes. An air and fuel conditioning portion comprised of a heat conducting metal tube is inserted within the inner or electrical insulating tube and is substantially coextensive in length with such inner tube. The air and fuel conditioning portion is formed with an inlet at one end and an outlet at its opposite end, and has inwardly extending heat radiating portions which are spaced longitudinally between the inlet and outlet. Air and fuel is introduced into the conditioning portion at the inlet and the prepared air and fuel is passed from the outlet to be burned.

An electrical heating element of coil type is wrapped around the inner tube and positioned within the space between the inner and outer tubes. Since this space is completely enclosed by heat insulating parts comprised of the outer heat insulating tube and the heat insulating supporting means all of the heat developed by the coil is confined within the fuel preparing apparatus. The inner tube is perforated over substantially its complete axial length to permit the heat developed by the coil, and within the space between the inner and outer tubes, to pass in a heat exchange relation with the metal air and fuel conditioning portion. By virtue of the air and fuel conditioning portion and the heating coil being substantially completely enclosed in an insulating housing practically all of the heat developed by the coil is effectively used in heating the conditioning portion to vaporize the liquid fuel therein for mixing together with the air.

Referring to Fig. 1 of the drawing the liquid fuel preparing means is indicated generally at 24 as including an outer heat insulating tube 48, composed of a ceramic or like material, which is internally threaded at one end 49 and has an inwardly extending annular flange 51 at its opposite end. Concentrically arranged within the outer tube 48 and substantially coextensive in length therewith is an inner electric insulating tube 52, composed of a ceramic material or the like, which has an enlarged portion 53 at one end formed with external threads 54 for engaging the internal threads at the end 49 of the outer tube 48. The flange 51, on insertion of the inner tube 52 within the outer tube 48, engages the periphery of the inner tube at its end 56 and cooperates with the enlarged portion 53 to support the tubes 48 and 52 in a spaced relation. The tubes 48 and 52 are thus concentrically arranged and supported in a spaced relation to form an annular space 57 therebetween having sides defined by the tubes 48 and 52 and ends defined by the enlarged portion 53 and the annular flange 51. By virtue of the ceramic composition of the inner tube 52, the enlarged portion 53 has heat insulating characteristics so that all of the walls defining the space 57 are heat insulating for a purpose which will appear later in the description.

Received within the inner tube 52 is a heat conducting tube 58, provided in copper or like material which constitutes an air and fuel mixing or conditioning portion having a closed end 59 with an inlet 61 therein and an open end 62 constituting an outlet for the mixing portion. The heat conducting tube 58 is comprised of two mating half portions 63 and 64 (Figs. 4 and 5) each of which carries in a longitudinally spaced relation inwardly extending heat radiating and baffle portions 66 of substantially semicircular shape. In the assembly of the tube half portions 63 and 64 to form the complete tube assembly 58, as by welding or like means, the heat radiating portions 66 on one of the tube portions are offset relative to the portions 66 on the other tube half so as to be in a staggered spaced relation longitudinally of the conditioning tube 58 and between the inlet 61 and outlet 62 thereof. The air and fuel passing through the mixing portion or tube 58 thus follow a serpentine path about the heat radiating portions 66. As clearly appears in Fig. 5 the tube portion 64 has the inlet 61 formed at one end for connecting the mixing tube 58 with the discharge end 67 of the fuel injection nozzle 47. The discharge end 67 of the nozzle is supported on the fuel preparing means 24 by threaded engagement within a threaded opening 69 formed in the enlarged portion 53 of the inner tube 52.

Located within the space 57 and wrapped around the inner tube 52 is an electric heating element 71 of coil type for heating the conditioning tube 58 to prepare the air and fuel introduced therein for burning. By virtue of the space 57 being completely enclosed by heat insulating walls, as previously mentioned, all of the heat generated by the coil is confined within the space 57. This developed heat is transmitted into a heat exchange relation with the mixing tube 58 through perforations 72 formed over substantially the full length of the inner tube 52.

The perforated construction of the tube 52 thus electrically insulates the coil 71 from the metal conditioning tube 58 while permitting substantially all of the heat generated by the coil to be used to heat the conditioning tube 58. A terminal 73 for connecting the coil to a source of power (not shown) is supported in the enlarged portion 53 and extended into the space 57 for connection with the coil end 74. The opposite end 76 of the coil 71 is electrically connected to the metal conditioning tube 58 which in turn carries a ground terminal 77 supported in the enlarged portion 53 in a position adjacent the power terminal 73. The terminal 77 includes a shank portion 78 suitably soldered or otherwise secured to the tube half portion 63 as is indicated in Figs. 1 and 4.

In the operation of the air and fuel preparing means 24 the fuel delivered to the injection nozzle 47 by the fuel pump is introduced into the conditioning tube 58 at the inlet 61, the fuel nozzle being located within a suitable air supply chamber of the heating unit. A portion of the air for mixing with the fuel enters the nozzle 47 through ports 79 and travels with the fuel into the tube 58. Additional air to be mixed with the fuel in the tube 58 is admitted directly into the tube through passages 81 formed in the outer tube 48, the enlarged portion 53 and the tube 58. With reference to Figs. 1 and 3 the outer tube 48 at its end 49 is formed with angularly spaced openings 82 extended axially of the outer tube 48. The inner tube 52 in that part of the enlarged portion 53 substantially above the terminal 77, as seen in Fig. 1, has a ribbed passage 83 extended circumferentially of the tube 52. The half portion 64 of the mixing tube 58 in turn has angularly spaced longitudinally extended openings 84, with the openings 82, 84 and passage 83 being arranged so as to be in substantial alignment radially of the fuel preparing means 24 when the inner and outer tubes 52 and 48, respectively, and the conditioning tube 58 are in relative assembly positions. By virtue of the openings 82 and 84 being extended transversely of the passage 83 adequate air communication is provided between the air supply chamber and the conditioning tube 58 through the passages 81.

The air and fuel introduced into the mixing tube 58 passes through the tube toward the outlet end 62 in the serpentine path defined by the heat radiating and baffle portions 66. Since the baffles 66 and the tube portions 63 and 64 are all composed of a heat conducting material they are readily heated by the transmission of heat thereto from the coil 71 and the space 57 to heat the air and fuel as it passes through the tube 58. The coil 71, for a representative kind of fuel adapted to be prepared by the fuel preparing means 24, is capable of becoming heated to a temperature of about 900° F. when operated with 6 amperes from a usual storage battery having a voltage pressure of six volts. This temperature is sufficient to heat the mixing tube 58 to heat the air and fuel therein and to vaporize the fuel for mixing together with the air, with the mixing being facilitated by the arrangement of the baffles 66. Further since the baffles and the tube 58 are all heated by the coil 71 the entire cross-sectional area of the tube 58 is at a fuel vaporizing temperature due to the radiation of heat inwardly of the tube by the baffles 66.

In order to distribute the vaporous air and fuel mixture over the outlet 62 of the fuel preparing means 24 there is provided a perforated heat insulating plate 86 which is fitted within the outlet 62 and functions to prevent a direct flow of all mixture portions from the outlet, and acts further to reduce the turbulence in the mixture as produced by the air supply fan 39 and the baffles 66. A mixture of substantially uniform fuel characteristics thus passes through the insulating plate 86 and into the effective igniting zone of ignition means located within the combustion passage of the heating unit. Since the tube 58 is closed relative to the space 57, and the space 57 in turn closed relative to the combustion passage it is seen that the coil 57 operates at all times in a space which is entirely free of any liquid fuel or vaporous air and fuel mixture.

From a consideration of the above description it is apparent that a quick starting and efficient operation of the heater apparatus is dependent upon a positive operation of the coil 71 to heat the conditioning tube 58 to at least a fuel vaporizing temperature. It follows also that the sooner the coil can be operated at an optimum temperature for vaporizing the fuel the less delay there will be in starting the operation of the heater. Where a large amount of electrical energy is available for operating the heater it is a relatively simple matter to operate a coil to produce sufficient heat to vaporize the fuel in the conditioning tube 58 regardless of the temperature conditions under which the heater is operated. However, where a battery is utilized as the sole source of power supply for the heater the electrical energy for operating the heater, and in turn the coil 71, is limited entirely by the available effective capacity of the battery. This effective capacity varies over relatively wide limits defined by a low and high charge condition of the battery. Further variation takes place because of the reduction in the effective capacity of the battery with low temperatures. It is desirable, therefore, that all of the heat developed by the coil 71 be used as completely as possible in the function of bringing the conditioning tube 58 as rapidly as possible to a fuel vaporizing temperature, and of retaining the tube at this temperature during the normal operation of the heater. In other words where all of the heat developed by the coil is not effectively used in heating the fuel to be burned a larger coil than is necessary is required for fuel conditioning purposes. This larger coil in turn produces a greater current drain on the battery for operating the coil. Also when the coil is rather small and appreciably effected as to its service life by the temperature at which it operates, its operation at a relatively high temperature to furnish a desired optimum heat to the mixing tube 58, shortens its service life.

By virtue of the construction of the liquid fuel preparing means 24 of this invention to provide for practically all of the heat developed by the coil 71 being usefully applied to heating the mixing tube 58, the coil 71 is capable of being operated with a minimum of current drain and at a temperature such that it can be operated efficiently over a prolonged service life. The life of the coil 71 is further prolonged due to its operation taking place entirely in an air space and entirely free of contact with any liquid or vaporous fuel portions or fumes resulting from the combustion or burning of the fuel in the combustion chamber 13.

From a consideration of the above description, therefore, it is seen that the invention provides a liquid fuel preparing apparatus in which an electrical heating element for heating the fuel to be prepared is relatively assembled in a thermal exchange relation with a metal heat conducting air and fuel mixing portion, but electrically insulated from such portion, with both the heating element and the mixing portion being substantially completely enclosed in a heat insulating housing so that practically all of the heat from the element is usefully applied in heating the mixing portion and in turn the air and fuel which is introduced into the mixing portion.

Although the invention has been described with reference to a particular embodiment thereof it is to be understood that it is not to be so limited since changes and modifications can be made therein which are within the full intended scope of this invention as defined by the appended claims.

I claim:

1. Apparatus for preparing a liquid fuel for burning comprising a heat transfer structure provided with an air and fuel mixing chamber having an inlet and an outlet, means for introducing fuel and air into said chamber at said inlet, means within said chamber for causing the fuel and air mixture to traverse a serpentine path during its passage through said chamber, an electrical insulating tube surrounding said structure and having spaced apertures through the thickness thereof for admitting heat to the surface of said structure, electrical heating means supported by said tube at the outer surface thereof, and heat insulating means surrounding said tube to define a space within which said heating means is disposed.

2. Apparatus for preparing a liquid fuel for burning comprising a heat transfer structure provided with an air and fuel mixing chamber having an inlet and an outlet, means for introducing fuel and air into said chamber at said inlet, means within said chamber for causing the fuel and air mixture to traverse a serpentine path during its passage through said chamber, an electrical insulating tube surrounding said structure and having spaced apertures through the thickness thereof for admitting heat to the surface of said structure, electrical heating means supported by said tube at the outer surface thereof, a second heat insulating tube surrounding said first-named tube, and means including said second tube for defining a space within which said heating means is disposed, said tubes and said structure having communicating openings therethrough at a point adjacent said inlet for admitting air to said chamber.

3. In apparatus for preparing a liquid fuel for burning, a heat transfer structure comprising opposed trough-like heat transfer members defining an air and fuel mixing chamber having an inlet and an outlet, means for introducing fuel and air into said chamber at said inlet, heat transfer parts extending transversely of said trough-like members within said chamber and alternately supported by the opposed trough-like members to provide a serpentine path for the passage of the fuel and air mixture through said chamber, an electrical insulating tube surrounding said members and having spaced apertures through the thickness thereof for admitting heat to the surfaces of said members, electrical heating means supported by said tube at the outer surface thereof, and heat insulating means surrounding said tube to define a space within which said heating means is disposed.

4. In a apparatus for preparing a liquid fuel for burning, a heat transfer structure comprising opposed trough-like heat transfer members defining an air and fuel mixing chamber having an inlet and an outlet, means for introducing fuel and air into said chamber at said inlet, heat transfer parts extending transversely of said trough-like members within said chamber and alternately supported by the opposed trough-like members to provide a serpentine path for the passage of the fuel and air mixture through said chamber, an electrical insulating tube surrounding said members and having spaced apertures through the thickness thereof for admitting heat to the surfaces of said members, electrical heating means supported by said tube at the outer surface thereof, a second heat insulating tube surrounding said first-named tube, and means including said second tube for defining a space within which said heating means is disposed, said tubes and one of said members having communicating openings therethrough at a point adjacent said inlet for admitting air to said chamber.

RUDOLPH L. LOWELL.

REFERENCES CITED

The following references are of record in the file of this patent:

UNITED STATES PATENTS

| Number | Name | Date |
| --- | --- | --- |
| 1,393,547 | Kotzebue | Oct. 11, 1921 |
| 1,430,383 | Kittel | Sept. 26, 1922 |
| 1,676,501 | Moors | July 10, 1928 |
| 1,687,148 | Schneider | Oct. 9, 1928 |
| 2,173,626 | Hillhouse | Sept. 19, 1939 |
| 1,825,830 | Sullivan | Oct. 6, 1931 |
| 2,117,108 | Spencer | May 10, 1938 |
| 2,286,857 | Holthouse, Jr. | June 19, 1942 |
| 953,748 | Kawasaki | Apr. 5, 1910 |
| 1,436,038 | Hemsing et al. | Nov. 21, 1922 |
| 1,658,582 | Waterman | Feb. 7, 1928 |
| 1,755,846 | Steed | Apr. 22, 1930 |
| 1,006,244 | Low et al | Oct. 17, 1911 |
| 1,121,868 | Riotte et al. | Dec. 22, 1914 |
| 1,006,244 | Low et al. | Oct. 17, 1911 |

FOREIGN PATENTS

| Number | Country | Date |
| --- | --- | --- |
| 350,784 | French | Apr. 19, 1905 |
| 691,327 | French | July 8, 1930 |